Dec. 20, 1966  H. L. KNIGHT  3,292,268
AUTOMOBILE FRONT WHEEL ALIGNING MECHANISM
Filed May 7, 1965
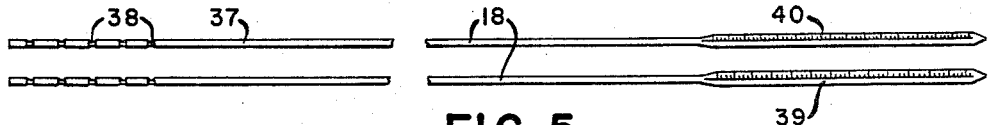
FIG. 5
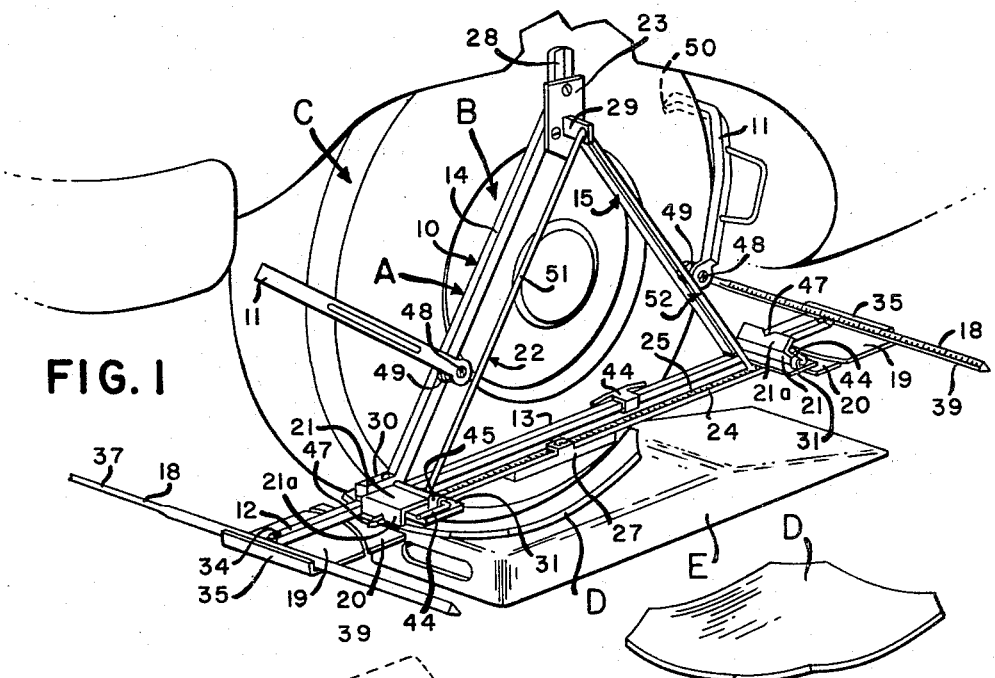
FIG. 1
FIG. 4
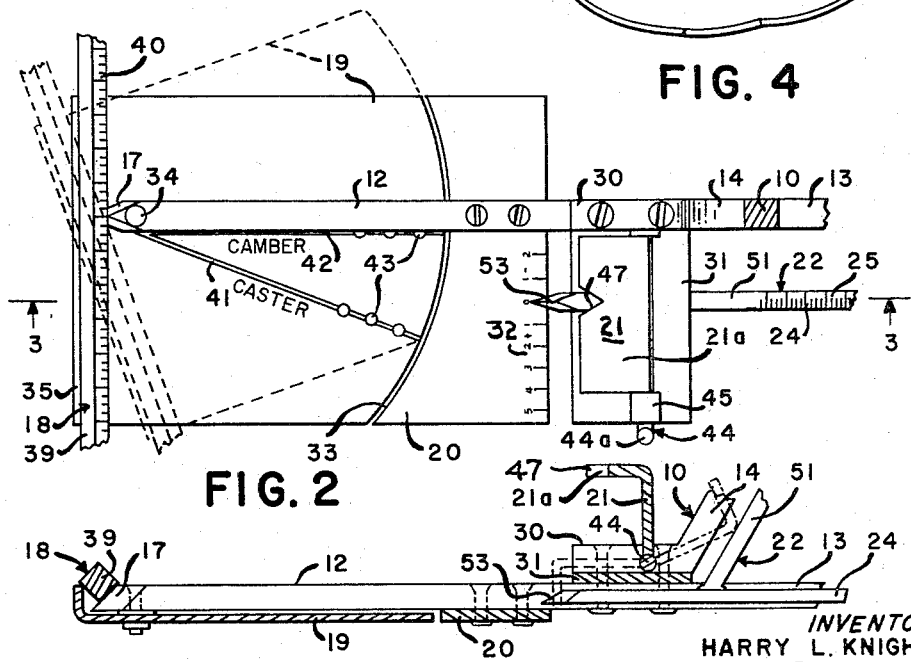
FIG. 2
FIG. 3
INVENTOR
HARRY L. KNIGHT
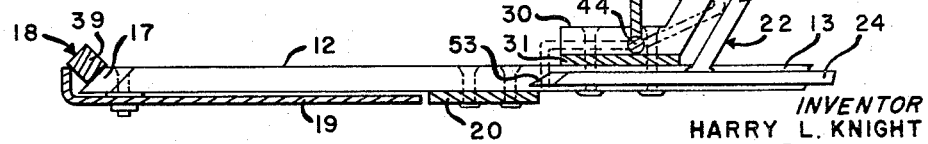
ATTORNEYS

United States Patent Office 3,292,268
Patented Dec. 20, 1966

3,292,268
AUTOMOBILE FRONT WHEEL ALIGNING MECHANISM
Harry L. Knight, 758 Struthers,
Grand Junction, Colo. 81501
Filed May 7, 1965, Ser. No. 453,905
7 Claims. (Cl. 33—203.18)

The present invention relates to wheel aligning mechanism, and pertains more particularly to mechanism for gauging the caster, camber, toe-in, toe-out and king pin inclination of the front wheels of an automotive vehicle.

In the past numerous mechanisms have been developed for hanging or fastening onto the front wheels of an automobile for checking various alignment characteristics thereof. While varying widely in structure, ease of application, simplicity in reading, and accuracy in providing the required information, most of these prior mechanisms include level or plumb indicating means in connection with one or more scales. Characteristic of this type of mechanism is that disclosed in my Patent No. 2,732,626, issued January 31, 1956, for "Device for Checking Wheel Alignment." The present invention pertains to this general type of mechanism.

An object of the present invention is to provide an improved, simplified, and highly accurate mechanism for mounting on the front wheels of an automotive vehicle to measure various alignment characteristics thereof.

A further object of the invention is to provide an improved wheel aligning mechanism having a frame for mounting on the outer side wall of the front wheel tires of an automotive vehicle, pendulum means suspended from an upper portion of the fixed frame, the pendulum having an elongated bottom member arranged for metering co-operation with scale means provided both on the frame and on the pendulum itself, sliding weight means being mounted on the pendulum.

The foregoing objects and advantages of the invention will be apparent from the following description and the accompanying drawings, wherein:

FIG. 1 is a perspective view showing one front wheel of an automobile with wheel aligning mechanism embodying the invention mounted thereon ready for use.

FIG. 2 is an enlarged, fragmentary, plan view of forward portions of the aligning mechanism shown in FIG. 1.

FIG. 3 is a sectional view taken along line 3—3 of FIG. 2.

FIG. 4 is a perspective view showing a dished steel plate, upon one of which each of the front wheels of an automobile preferably is mounted during use of the present invention.

FIG. 5 is a side elevational view of a pair of transversely extending rods for measuring toe-in and toe-out, and for indicating the angular position of the front wheels.

Briefly, two similar assemblies A are provided, one for mounting upon each front wheel B of an automobile to be aligned. Each assembly A comprises a generally triangular stationary frame 10, which is supported against the outer side wall of a front wheel tire C by a pair of suspension hooks 11. Both end portions 12 of the bottom member 13 of the triangular frame 10 project similarly well beyond the side elements 14 and 15 thereof, and each projecting end portion 12 terminates in an inclined, chisel point 17 for supporting, in indicating position the square end portion of one of a pair of identical cross rods 18 (FIG. 5). A cross-rod support and angle indicating plate 19 is pivotally mounted near each end 13, and a scale plate 20 is fixedly mounted just inwardly of each pivoted plate 19. A hingedly mounted damping plate 21 for controlling movements of a pendulum 22 is mounted just inwardly of each fixed scale plate 20. The pendulum 22 is suspended from a pendulum support bracket 23 affixed to an upper portion of the frame 10, and the bottom member 24 of the pendulum comprises a rod having a scale 25 thereon for indicating the position of a sliding weight 27 mounted thereon. The pendulum bottom member 24 is pointed at both ends and projects over the fixed scale plate 20 therebeneath.

By turning the front wheels B to selected angles and manipulating the hingedly mounted damping plates 21 and the sliding weight 27 in a manner to be described later herein, various alignment characteristics of the front wheels including caster, camber, king pin inclination and toe-in and toe-out can be easily, rapidly and accurately determined.

To facilitate turning the front wheels during alignment thereof and to provide an enlarged support area for each front tire C, each such tire preferably is mounted on a spherically dished plate D, which in turn is mounted upon a ramp approximately three inches in height. This arrangement elevates the front wheels B sufficiently to simulate suspension conditions when the automobile is moving at a speed of approximately 55 miles per hour.

Referring to the drawings of the illustrative embodiment of the invention in greater detail, each stationary frame 10 is of square rod in the form of an isosceles triangle. The upper end portions 28 of the two similar side members 14 and 15 of the triangular frame 10 are bent and are secured to extend parallel and in contact with each other.

The pendulum support bracket 23 has an arm 29 extending perpendicularly therefrom, which arm is centered on the plane of intersection of the upwardly extending rod portions 28. The lower end portions 30 of both frame side members 14 and 15 are bent outwardly into alignment with each other, and are secured to the frame bottom member 13, with a plate 31 which supports each hingedly mounted pendulum damping plate 21 interposed and gripped therebetween. The frame bottom member 13 is a straight, square rod, and extends at 12 equally at both ends thereof as shown in FIGS. 1–3.

One of the fixed scale plates 20 is secured to the under side of each projecting end portion 12 of the frame bottom member 13, and is provided with scale markings 32 along its inner edge. The pointed end of the pendulum bottom member 24 positioned thereover indicates caster and camber on this scale in a manner to be described later herein.

The outward edge 33 of each fixed scale plate 20 is curved concentrically with a pivot pin 34 which pivotally connects each cross-rod support and angle indicating plate 19 to the under side of its associated end portion 12 of the frame bottom member 13. The inward edge of each pivotally mounted plate 19 is curved concentrically with, and is spaced slightly from, the curved outward edge of its associated fixed scale plate 20 to permit free pivotal movement of the pivoted plates.

A flange 35 is bent upwardly along the outward edge of each pivoted plate 19 to support against the inclined chisel edge 17 of its associated frame bottom member 13, one of the two identical cross rods 18. Each cross rod 18 comprises a round portion 37 having a plurality of annular grooves 38 therein at selected spaced distances from the end thereof for automobiles of different tread widths, and a square end portion 39 having a scale 40 marked along one side thereof. When setting up the mechanisms A, the cross rods 18 are placed, one across the forward end and one across the rearward end of the pivoted plates 19 of each of the two mechanisms A.

The round portion 37 of each cross rod 18 is placed along the inner side of the upturned flange 35 of each of the pivotally mounted plates 19 of one of the mechanisms A, with corresponding annular grooves 38 in each cross rod 18 resting on, and engaged by, the adjacent inclined chisel edges 17 of the frame bottom member 13. The square end portion 39 of each cross rod 18 is similarly mounted as shown in FIGS. 1–3 on the pivotally mounted plates 19 of the other mechanism A, with each scale 40 inclined toward its associated chisel edge 17 so that the latter serves as a pointer to read the scales 40.

Two wheel angle indicating lines 41 and 42 are inscribed on each pivotally mounted plate 19 to align with a side of the frame bottom member 13. One of these lines 41 indicates when the automobile wheels are in their straight-ahead position for measuring camber and toe-in, and other line 42 indicates when the front wheels are turned to a desired angle for measuring caster, toe-out and king pin inclination. A plurality of punch marks 43 are provided in centered position along each of these lines so that the punch marks will be visible as shown in FIG. 2 when the line along which they are centered is concealed beneath the frame bottom member 13.

Each hingedly mounted dampening plate 21 is mounted on pivot rod 44, which is journaled in a hole provided therefor in the outturned lower end portion 30 of each inner frame side member 14 and 15 and in a bearing bracket 45 secured to an outer portion of its associated support plate 31. A bent handle portion 44a is provided on each rod 44 for manipulating the pendulum damping plates 44. Each damping plate 21 has a flange portion 21a bent outwardly on the free end thereof, and a notch 47 is provided on the free edge of each flange 21a for straddling and centering the pendulum bottom member 24.

For mounting each assembly A on a tire C, a pair of the suspension hooks 11 are provided. Each mounting hook 11 is pivotally mounted on a bolt 48 secured in a hole provided therefor in each frame side member 14 and 15, and a coil spring 49 is held in compression between its associated mounting hook and side frame member 14 or 15 as the case may be. Each mounting hook 11 is shaped to extend well over the tread of an automobile tire C upon which its associated mechanism A is to be mounted, and has a pointed end 50 directed inwardly to engage the tire and prevent slipping during use.

The illustrated pendulum 22, like the frame 10, is in the form of an isosceles triangle, equal side portions 51 and 52 thereof being formed from a single length of rough metal rod bent centrally thereof and inserted through a hole provided therefor in the arm 29 of the pendulum support bracket 23. The hole is of a size to permit free swinging movement of the pendulum within the limits imposed by the plates 20 and 31 between which the pendulum bottom member 24 swings, and is far enough out from the plane of the frame 10 to permit the pendulum to swing laterally clear of the frame 10 during use.

The lower ends of the pendulum side members 51 and 52 are secured to the pendulum bottom member 24, which is a straight rod smaller in diameter than the frame bottom member 13. Both end portions 53 of the pendulum bottom member 24 extend equally beyond the pendulum side members 51 and 52 a sufficient distance to overlie the scale 32 on its associated fixed scale plate 20, and the ends of the pendulum bottom member are pointed as shown in FIG. 2 to serve as indicating pointers on their respective scales 32.

The pendulum 22 is of such a height that when the bottom frame member 13 is horizontal, the sliding weight 27 is centered on the pendulum bottom member 24, and the damping plates 21 are swung upwardly free of engagement with the pendulum 22, both ends of the pendulum bottom member 24 will swing clear, midway between their respective damper support plates 31 and fixed scale plates 20 as shown in FIG. 3.

Operation

In using the illustrative form of the invention, the front wheels B of an automobile to be aligned preferably are first jacked up, and, with the air pressure of all tires checked and adjusted to that recommended for the particular automobile being checked, each front tire is checked for runout of its outer side wall. This may be done in a well known manner by fixedly mounting a suitable member (not shown) in laterally opposite, slightly spaced relation to the side wall of the tire being checked, and then spinning the wheel upon which such tire is mounted. Any high spot thus found should be marked, as with a piece of chalk.

The dished plates D are mounted, one on each of the two ramps E as shown in FIG. 1, and the front wheels of the automobile to be aligned are supported in substantially centered position thereon. Any bump or high spot marked during the run-out check should be located at the 2:30 position on each tire, assuming that the outer side of each tire is the dial of a clock. The dished support plates D are of substantially spherical, concavo-convex curvature, the radius of which corresponds approximately to that of an automobile tire which it is designed to support. Each plate D thus provides a large support area for its tire, and a substantially single point support on its ramp E.

One of the assemblies A is then mounted, by means of its supporting hooks 11, against the outer side wall of each front tire C as shown in FIG. 1, with the parallel upper extensions 28 of the frame 10 at approximately the top center of the tire C, and the frame bottom member 13 approximately horizontal. The frame 10 is then more accurately adjusted to upright condition by swinging both of the damping plates 21 to their upright position, clear of possible engagement with the pendulum 22. The frame 10 is then tilted forwardly or rearwardly on its tire as required to cause the end portions 53 of the pendulum bottom member 4 to swing free, and centered vertically between, their respective damping plate support plates 31 and fixed scale plates 20 as shown in FIG. 3.

If, in checking side wall runout as explained previously herein, the side wall runout was found to be slight, it can be ignored. If substantial, it is corrected for as follows:

Adjusted for side wall runout

With the front wheels B in their straight-ahead position as shown in FIG. 1, slide the weight 27 on the pendulum bottom member 24 all the way forward. Swing the forward damping plate 21 inwardly and rearwardly (clockwise as shown in FIG. 1) to urge the pendulum rearwardly. Then swing the rear damper plate 21 rearwardly and downwardly (also clockwise as shown in FIG. 1) to center the rear end of the pendulum bottom member 24 in the notch 47 in the rear damper plate. Then swing the forward damper plate 21 upwardly clear of the pendulum and read the position of the pointed forward end 53 of the pendulum bottom member 24 on the forward fixed scale 32. Then reverse this procedure and read the rear fixed scale 32. Both should read the same. If not, it indicates that the portions on the tire side wall against which the bottom frame member 13 rests are not in a true fore-and-aft plane. Correction is made by sliding a cam member 44 slidably mounted on the frame bottom member 13 to selectively inserted position between the frame bottom member 13 and one side or the other as required of the tire upon which the mechanism A is mounted so as to move that end of the frame bottom member 13 outwardly away from the tire by an amount equal to one-half the indicated error. After using the mechanism a few times this correction can be made on the first try.

Toe-in

To find toe-in (or toe-out in the straight-ahead position of the wheels if it should be present) the two cross rods 18 (FIG. 5) are mounted as shown in FIG. 1 across the front and rear ends, respectively, of both assemblies A. The round end portion 37 of each cross rod rests along the inner side of its respective flange 35, and with corresponding grooves 38 of each rod resting upon, and engaged by, the adjacent chisel-pointed end 17 of one mechanism A, and with the square other end portion 39 of each cross rod 18 resting similarly along the inner side of its respective flange 35 and upon the adjacent chisel pointed end 17 of the other mechanism A, with the scale 40 provided on each square rod portion 39 facing upwardly and inclined toward its supporting chisel-pointed end 17.

It the point indicated by the chisel-pointed end 17 on the scale 40 on the forward cross rod 18 is greater than that indicated by the chisel-pointed end 17 on the scale 40 on the rear cross rod 18, it shows toe-out. If the reverse, toe-in. The difference between the scale readings at the two indicated points is the amount of toe-out or toe-in present.

*Camber*

To find the camber, with the wheels still in their straight-ahead position, move the sliding weight 27 all the way back on the pendulum bottom member 24. Swing both damping plates 21 outwardly and downwardly to center the two projecting end portions 53 of the pendulum bottom member in the damping plate notches 47. Then swing the rear damping plate 21 upwardly and forwardly (counterclockwise as shown in FIG. 1) as far as possible to urge the pendulum 22 forwardly, and then free the rear end of the pendulum by swinging the rear damping plate 21 upwardly clear of the pendulum. The amount of camber is indicated by the position of the pointed rear end of the pendulum bottom member 24 on the rear fixed scale 32. Repeat the foregoing procedure on the other assembly A to find the camber of the other front wheel.

*Caster*

To find the caster, move the sliding weight 27 on the pendulum bottom member 24 all the way forward, and turn the front wheels to center the line marked "caster" on the pivotally mounted plate 19 on one assembly A so that lines lies along an edge of its associated frame bottom member 13. Swing both damping plates 21 outwardly and downwardly to center the two ends of the pendulum bottom member 24 within the notches 47. Swing the forward damping plate 21 upwardly and inwardly as far as possible to urge pendulum 22 to rearward position. Then swing the forward damping plate 21 upwardly clear of the pendulum and read the caster from the position indicated by the pointed forward end of the pendulum bottom member 24 on the forward fixed scale 32. Repeat the foregoing procedure on the other assembly A to determine the caster of the other front wheel after first turning the front wheels to align the line marked "caster" on the other assembly with an edge of its associated frame bottom member 13.

*King pin inclination*

To find the king pin inclination of each wheel after taking the "caster" reading, and without disturbing the setting of the front wheels, swing both damping plates 21 upwardly free of the pendulum and balance the pendulum to bring the end portions 53 of the pendulum bottom member to centered position between the plates 20 and 31 by moving the sliding weight 27 along the pendulum bottom member 24. The king pin inclination is then read on the scale 25 in the center of an opening 54 provided therefor in the sliding weight 27.

The invention provides a simple, inexpensive, easily understood and highly accurate wheel aligning mechanism, whereby any service station or small garage can readily perform this highly important service.

While I have illustrated and described a preferred embodiment of the present invention, it will be understood, however, that various changes and modifications may be made in the details thereof without departing from the scope of the invention as set forth in the appended claims.

Having thus described the invention, what I claim as new and desire to protect by Letters Patent is defined in the following claims.

1. Mechanism for measuring alignment characteristics of a pneumatic tired dirigible wheel of an automobile comprising
 a frame for mounting on the outer side wall of the tire of such dirigible wheel,
 support means for supporting the frame in engagement with the outer sidewall of such tire and substantially parallel to the plane of wheel rotation,
 a wheel angle indicating member mounted for horizontal pivotal movement about a vertical axis on the frame,
 means for retaining the wheel angle indicating member against pivotal displacement during a turning movement of the frame in conjunction with a dirigible wheel upon which it is mounted,
 means for indicating the angular position of the angle indicating member relative to the frame,
 a pendulum suspended from an upper portion of the frame and in outwardly spaced relation to the frame,
 an elongated bottom member affixed to the pendulum in position to be horizontal and sustantially parallel to the plane of rotation of a wheel upon which the frame is mounted when the pendulum is suspended freely from the frame,
 means for releasably retaining each end of the pendulum bottom member in a selected zero position while leaving the pendulum bottom member free for pivotal movement about the retaining means,
 a pointed projection on each end of the pendulum bottom member,
 a pair of pendulum position indicating members on each end of the frame, each pair of said indicating members being located and spaced apart to receive each pointed projection of the pendulum bottom member with slight clearance therebetween when the frame is in upright position and the pendulum is suspended freely from the frame,
 a scale for indicating the position of each pointed projection of the pendulum relative to the frame,
 manually controlled damping means mounted on the frame for releasably engaging the pendulum to reduce swinging movement thereof,
 a sliding weight mounted for sliding movement lengthwise of the pendulum bottom member,
 and a scale for indicating the position of the sliding weight relative to the pendulum bottom member.

2. Mechanism for measuring alignment characteristics of a dirigible wheel of an automobile comprising
 a frame for mounting flush against the outer side wall of such dirigible wheel,
 support means for supporting said frame in flush engagement with the outer sidewall of such tire,
 a wheel angle indicating member mounted for horizontal pivotal movement about a vertical axis on the frame,
 means for indicating the angular position of the angle indicating member relative to the frame,
 a pendulum suspended from an upper portion of the frame and in outwardly spaced relation to the frame, the pendulum having a bottom member which is horizontal when the pendulum is suspended freely,
 a pointed projection extending laterally from a lower portion of the pendulum,
 a pair of members on the frame, and spaced apart to receive the pointed projection therebetween and with slight clearance from each thereof when the frame is in upright position with the pendulum suspended freely from the frame,
 scale means for indicatiing the position of the pointed projection of the pendulum relative to the frame, a sliding weight mounted for sliding movement lengthwise of the pendulum bottom member, and a scale for indicating the position of the sliding weight on the pendulum bottom member.

3. Mechanism for measuring alignment characteristics of the dirigible wheels of an automobile comprising a pair of frames for mounting one flush against the outer side wall of each of a pair of such dirigible wheels, support means on each frame for supporting said frame in flush engagement with the outer sidewall of such tire, an angle indicating member mounted for horizontal pivotal movement about a vertical axis on the forward and rearward end of each frame, means for indicating the angular position of each angle indicating member relative to the frame upon which it is mounted, a pendulum suspended from an upper portion of each frame and in outwardly spaced relation to its frame, the pendulum having a bottom member which is horizontal when the pendulum is suspended freely, a pointed projection extending laterally from a lower portion of each pendulum, a pair of outwardly extending members on the frame, and spaced apart to receive each pointed projection on each pendulum therebetwen and with slight clearance from each of said outwardly extending members when the frame is in upright position with the pendulum suspended freely therefrom, scale means for indicating the position of each pointed projection of the pendulum relative to the frame, a sliding weight mounted for sliding movement lengthwise of the pendulum bottom member, and a scale for indicating the position of the sliding weight on the pendulum bottom member.

4. Mechanism for measuring alignment characteristics of a dirigible wheel of an automobile comprising a frame for mounting flush against the outer side wall of such dirigible wheel, support means for supporting said frame in flush engagement with the outer sidewall of such tire, a wheel angle indicating member mounted for horizontal pivotal movement about a vertical axis on the frame, means for indicating the angular position of the angle indicating member relative to the frame, a pendulum suspended from an upper portion of the frame and in outwardly spaced relation to the frame, an elongated bottom member secured to the pendulum, a pointed projection on each end of the pendulum bottom member, a pair of pendulum position indicating members on each end of the frame, each pair of said members being located and spaced apart to receive each pointed projection with slight clearance therebetween when the frame is in upright position with the pendulum suspended freely from the frame, scale means for indicating the position of each pointed projection of the pendulum relative to the frame, a sliding weight mounted for sliding movement lengthwise of the pendulum bottom member, and a scale for indicating the position of the sliding weight on the pendulum bottom member.

5. An arrangement according to claim 4 wherein a cam member is mounted on one side of the frame and is movable gradually to a selected position between that side of the frame and the sidewall of a tire against which the frame is mounted when necessary to bring the frame into a position substantially parallel to the plane of wheel rotation.

6. Mechanism for measuring alignment characteristics of the pneumatic tired dirigible wheels of an automobile comprising a pair of rigid triangular frames for mounting one on the outer side of each of a pair of such dirigible wheels, support means on each triangular frame for supporting each of the frames in engagement with the outer sidewall of the tire of each such wheel and substantially parallel to the plane of wheel rotation, a member forming the bottom the frame extending both forwardly and rearwardly beyond a tire upon which the frame is mounted, an angle indicating plate mounted for horizontal pivotal movement about a vertical axis on the forward and rearward end of each frame bottom member, a pair of cross rods extending one transversely across the pivoted plates of both frames at the front and rear thereof, respectively and engaging the pivoted plates to retain them against pivotal movement, scale indicia for indicating the angular position of each pivotally mounted plate relative to its associated frame bottom member, a pendulum of isosceles triangular shape suspended at the apex of its equal sides from an upper portion of the triangular frame and in outwardly spaced relation to the frame, a pointed projection extending from each lower corner of the pendulum, a pair of outwardly extending members on the frame, and spaced apart to receive each pointed projection on the pendulum therebetween and with slight clearance from each of said outwardly extending members when the frame is in upright position with the pendulum suspended freely therefrom, scale means for indicating the position of each pointed projection of the pendulum relative to the plane defined by the frame, a sliding weight mounted for sliding movement lengthwise of the pendulum bottom member, and a scale on the pendulum bottom member for indicating the position of the sliding weight thereon.

7. Mechanism for measuring alignment characteristics of a pneumatic tired dirigible wheel of an automobile comprising a generally planiform frame for mounting on the outer side wall of the tire of such dirigible wheel, support means for supporting the frame in engagement with the outer sidewall of such tire and substantially parallel to the plane of wheel rotation, means for bringing the frame into parallelism with the plane of wheel rotation, a wheel angle indicating member mounted for horizontal pivotal movement about a vertical axis on the frame, means for returning the wheel angle indicating member against pivotal displacement during a turning movement of the frame in conjunction with a dirigible wheel upon which the frame is mounted, means for indicating the angular position of the angle indicating member relative to the frame, a pendulum suspended from an upper portion of the frame and in outwardly spaced relation to the frame, an elongated bottom member affixed to the pendulum in position to be horizontal and substantially parallel to the frame when the pendulum is suspended freely from the frame, means for releasably retaining each end of the pendulum bottom member in a selected zero position while leaving the pendulum bottom member free for pivotal movement about the retaining means, a pointed projection on each end of the pendulum bottom member, a pair of pendulum position indicating members on each end of the frame, each pair of said indicating members being located and spaced apart to receive each pointed projection of the pendulum bottom member with slight clearance therebetween when the frame is in upright position and the pendulum is suspended freely from the frame, and a scale for indicating the position of each pointed projection of the pendulum relative to the frame.

References Cited by the Examiner

UNITED STATES PATENTS

| | | | |
|---|---|---|---|
| 2,160,226 | 5/1939 | Phillips | 33—203.18 X |
| 2,627,123 | 2/1953 | Taber | 33—203.18 |
| 2,732,626 | 1/1956 | Knight | 33—203.2 |
| 2,737,728 | 3/1956 | Taber | 33—203.2 |

FOREIGN PATENTS 768,197  2/1957  Great Britain.

LEONARD FORMAN, *Primary Examiner.*